(12) United States Patent
Devam et al.

(10) Patent No.: US 8,176,227 B2
(45) Date of Patent: May 8, 2012

(54) METHOD AND SYSTEM FOR HIGH-SPEED DETECTION HANDSHAKE IN UNIVERSAL SERIAL BUS BASED DATA COMMUNICATION SYSTEM

(75) Inventors: Mayank Devam, Lucknow (IN); Vinay Gupta, Noida (IN); Akshat Mittal, New Delhi (IN); Parul K Sharma, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 259 days.

(21) Appl. No.: 12/628,222

(22) Filed: Dec. 1, 2009

(65) Prior Publication Data

US 2011/0131356 A1 Jun. 2, 2011

(51) Int. Cl.
*G06F 13/42* (2006.01)
(52) U.S. Cl. ............ 710/105; 710/33; 710/61; 710/106; 710/110; 710/314
(58) Field of Classification Search .......... 710/104–106, 710/110, 305–315, 33–36, 61–63; 455/218–222, 455/115.2
See application file for complete search history.

(56) References Cited

U.S. PATENT DOCUMENTS

| | | | |
|---|---|---|---|
| 6,131,135 A | 10/2000 | Abramson et al. | |
| 6,653,892 B2 * | 11/2003 | Park | 327/563 |
| 6,668,296 B1 | 12/2003 | Dougherty et al. | |
| 6,901,471 B2 * | 5/2005 | Govindaraman | 710/305 |
| 6,938,110 B2 | 8/2005 | Chan et al. | |
| 6,954,808 B2 * | 10/2005 | Russell | 710/62 |
| 7,069,373 B2 | 6/2006 | Teng | |
| 7,120,408 B2 * | 10/2006 | Wood | 455/218 |
| 7,281,069 B2 * | 10/2007 | Turner et al. | 710/105 |
| 7,282,965 B2 * | 10/2007 | Hatooka et al. | 327/80 |
| 7,447,930 B2 | 11/2008 | Yeh | |
| 7,653,367 B2 * | 1/2010 | Song et al. | 455/218 |
| 7,831,223 B2 * | 11/2010 | Kawashima | 455/115.2 |
| 2005/0026581 A1 * | 2/2005 | Wood | 455/219 |
| 2006/0121866 A1 * | 6/2006 | Yamamoto et al. | 455/222 |
| 2007/0241769 A1 * | 10/2007 | Song et al. | 326/30 |
| 2007/0255883 A1 * | 11/2007 | Ulenas | 710/313 |
| 2008/0162737 A1 | 7/2008 | Liu et al. | |
| 2008/0320180 A1 | 12/2008 | Manabe | |
| 2009/0132738 A1 | 5/2009 | Aytur et al. | |

* cited by examiner

*Primary Examiner* — Raymond Phan
(74) *Attorney, Agent, or Firm* — Charles Bergere (57) ABSTRACT

A USB system includes a USB hub, a USB device, and a USB bus interconnecting the USB hub and the USB device. The USB hub asserts a reset signaling on the USB bus to initiate a high-speed detection handshake. The USB hub and the USB device activate corresponding dual-mode squelch detectors in a first (handshake) mode of operation. The USB device transmits a device chirp signal to the USB hub. The USB hub responds with a sequence of hub chirp signals. The USB device detects the hub chirp signals and then the USB hub and the USB device establish a communication link in a high-speed mode of communication in accordance with USB 2.0. The dual-mode squelch detectors in the USB hub and the USB device can also be activated in a second (normal) mode of operation.

18 Claims, 10 Drawing Sheets

METHOD AND SYSTEM FOR HIGH-SPEED DETECTION HANDSHAKE IN UNIVERSAL SERIAL BUS BASED DATA COMMUNICATION SYSTEM

BACKGROUND OF THE PRESENT INVENTION

The present invention relates generally to data communication, and more specifically, to a system and a method of high-speed detection handshaking between Universal Serial Bus (USB) devices in a USB based data communication system.

USB is a serial bus standard that facilitates data communication. USB Implementers Forum (USB-IF) is an industry standards body that defines the standardized USB specification. To date, three versions of the USB specification have been released, namely, USB 1.1, USB 2.0 and USB 3.0.

Figure 1:
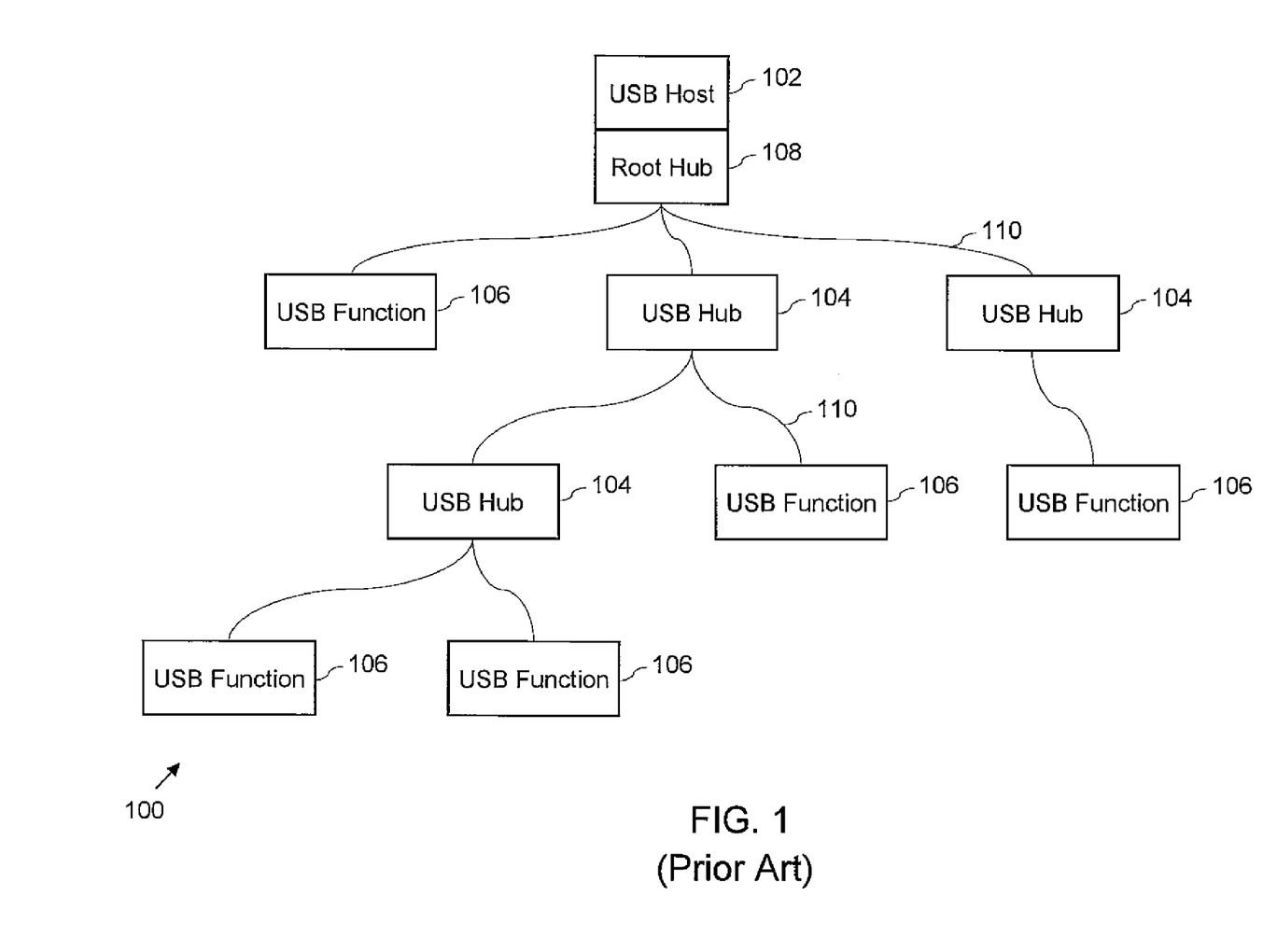
FIG. 1 is a block diagram illustrating a conventional USB system.

Referring to FIG. 1, a USB system 100 includes a USB host 102 and one or more USB devices such as one or more USB hubs 104 and one or more USB functions 106. The USB host 102 includes a root hub 108. The USB system 100 further includes a USB interconnect 110. In accordance with the USB specification, each USB system 100 includes the USB host 102 and one or more USB devices interconnected in a tiered star topology using the USB interconnect 110.

The USB host 102 is a computational system that controls the USB system 100. The root hub 108 or the USB host 102 provides a connection interface for connecting one or more of the USB devices to the USB host 102. The USB hub 104 is a USB device that provides a connection interface for one or more USB functions 106 to connect to the USB system 100. The USB function 106 is a USB device that enables one or more functionalities in the USB system 100 such as mouse, keyboard, storage devices, imaging devices, and audio and video applications.

The USB interconnect 110 defines the connection between the USB host 102 and the USB devices. The USB interconnect 110 has a tiered star topology for interconnecting the USB host 102 and the USB devices in the USB system 100. The USB host 102 is at the center of the tiered star topology. Each connection between the USB host 102 and a USB device or between one USB device and another USB device is a point-to-point connection. All the point-to-point connections in the USB system 100 together constitute the USB interconnect 110.

In accordance with USB 2.0, when two devices are directly connected to each other through the USB interconnect 110, the USB device logically closer to the USB host 102 in a data transfer path is referred to as an upstream device and the USB device logically farther from the USB host 102 in the data transfer path is referred to a downstream device. As used herein, the term 'USB hub' refers to the USB hub 104 as well as the root hub 108 and the term 'USB device' refers to the USB hub 104 as well as the USB function 106, unless specifically mentioned otherwise.

The data transfer rates between versions of the specification have increased significantly. USB 1.1 defined low-speed and full-speed communication modes, which enabled data transfer rates of 1.5 Mbits/s and 12 Mbits/s respectively. USB 2.0 introduced a high-speed communication mode, which enabled a data transfer rate of 480 Mbits/s, and USB 3.0 has introduced a super-speed communication mode, which enables a data transfer rate of 5.0 Gbits/s.

USB 2.0 requires that USB devices are backward compatible. When a USB device is connected to a USB hub, the USB hub detects the data transfer capability of the USB device and a communication mode supported by both the USB hub and the USB device is selected. Thus, a high-speed capable USB device must be able to communicate with a full-speed capable hub in full-speed communication mode. To ensure backward compatibility, a high-speed capable USB device initially connects to a USB hub as a full-speed device. The USB hub and the USB device engage in high-speed detection handshaking based on chirp signaling. In addition, whenever the USB hub resets the USB device, irrespective of the state of the USB device before the reset signaling, the USB hub and the USB device engage in high-speed detection handshaking.

Figure 2A:
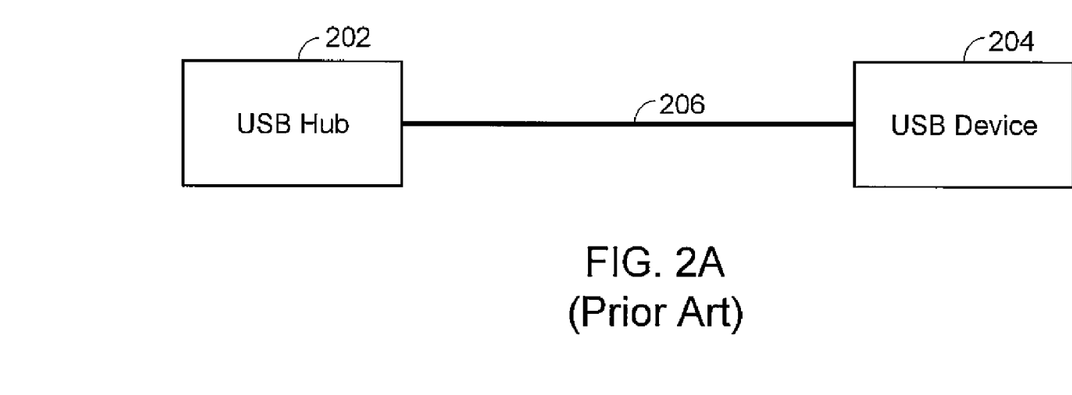
FIGS. 2A and 2B illustrate a USB hub, a USB device, and a USB bus participating in a high-speed detection handshake in the USB system of FIG. 1.
Figure 2B:
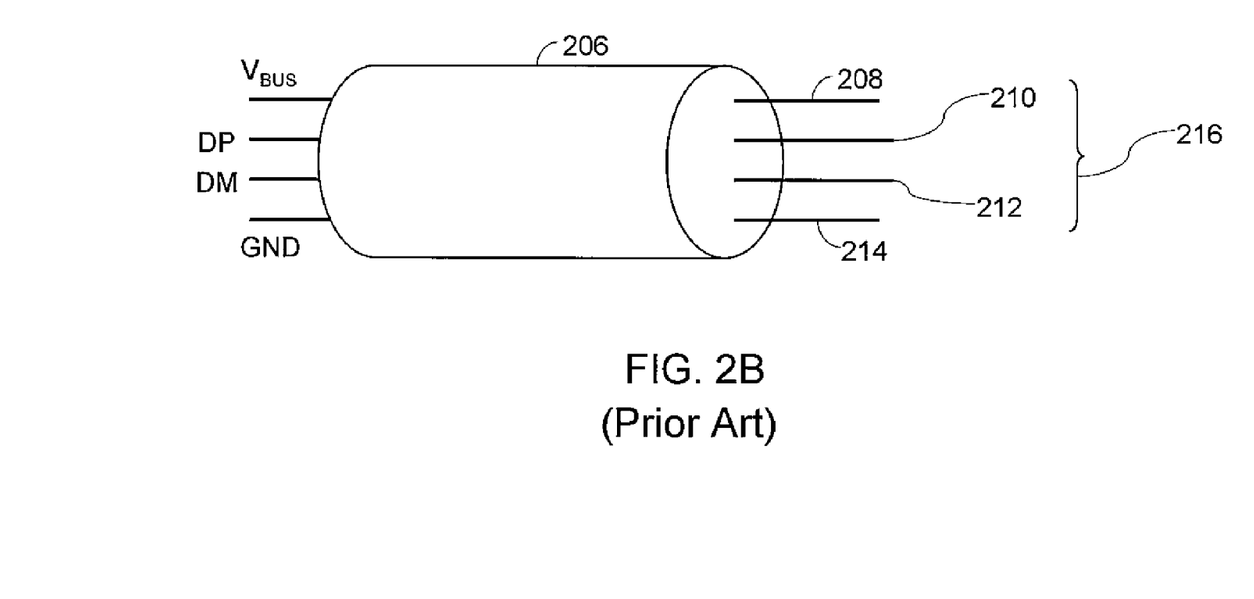

Referring now to FIGS. 2A and 2B, an example of a USB hub 202 and a USB device 204 participating in high-speed handshaking in the USB system 100 are shown. The USB hub 202 and the USB device 204 are connected by a USB cable 206. The USB cable 206 includes a voltage wire 208, a first data line (DP) 210, a second data line (DM) 212, and a ground wire 214. The first data line 210 and the second data line 212 are collectively referred to as a USB bus 216.

The data is transmitted between the USB hub 202 and the USB device 204 using half-duplex differential signaling on the USB bus 216. The voltage wire 208 delivers power to the USB device 204 and the ground wire 214 provides a connection to ground voltage level in the USB system 100.

In accordance with USB 2.0, each USB device includes a transceiver (not shown) to transmit and receive signals. The USB hub 202 includes a first transceiver and the USB device 204 includes a second transceiver. Accordingly, the first transceiver of the USB hub 202 is a downstream transceiver and the second transceiver of the USB device 204 is an upstream transceiver. The first and the second transceivers implement a set of common functionalities (as will be explained in conjunction with FIG. 5).

Each transceiver includes a squelch detector (not shown) that indicates the validity of the differential signal. During communication between the USB devices, if the differential signal between the first data line 210 and the second data line 212 is below a first threshold voltage level $V_L$, the differential signal is considered invalid. The differential signal between the first data line 210 and the second data line 212 should exceed a second threshold voltage level $V_H$ to be qualified as a valid signal. In accordance with USB 2.0, $V_L$=100 mV and $V_H$=150 mV.

During high-speed detection handshaking, the USB hub 202 asserts a reset signaling on the USB bus 216. The USB hub 202 drives the first and second data lines 210 and 212 to ground (driven SE0 state) at reset time instant ($T_0$). The USB hub 202 asserts the reset signaling for a predefined time interval ($T_{DRST}$) in accordance with USB 2.0.

The USB device 204 detects the reset signaling and ensures that the second transceiver of the USB device 204 is in a full-speed communication mode. Subsequently, the USB device 204 transmits a device chirp to the USB hub 202. The device chirp signal is generated by injecting a predefined amount of current onto the second data line (DM) 212 for a predefined time interval. The device chirp signal is referred to as device K-chirp signal. In accordance with USB 2.0, the device chirp signal should be initiated at a time instant not less than 1.0 ms ($T_{UCH}$) and not more than 7.0 ms ($T_{UCHEND}$) after the reset time instant ($T_0$).

If the USB hub 202 successfully detects the device chirp signal and is high-speed capable, it transmits a sequence of hub chirp signals to the USB device 204. The sequence of hub chirp signals is generated by injecting a predefined amount of current alternately onto the second data line (DM) 212 and the first data line (DP) 210. The injection of current on the second data line (DM) 212 and the first data line (DP) 210 leads to hub chirp signals referred to as hub K-chirp signal and hub J-chirp signal respectively. The sequence of hub chirp signals is initiated within 100 μs ($T_{WTDCH}$) from the detection of the device chirp signal. Each of the hub chirp signals must last for no less than 40 μs and no more than 60 μs, and there must not be any idle states between the hub chirp signals.

The USB device 204 switches to high-speed communication mode based on successful detection of the sequence of hub chirp signals. However, if the USB host 202 is not high-speed capable, it does not transmit the sequence of hub chirp signals and the USB device 204 remains in the full-speed communication mode at the end of the reset signaling. Thus, a high-speed capable USB hub 202 and a high-speed capable USB device 204 must successfully accomplish high-speed detection handshaking to communicate in high-speed communication mode. The process of high-speed detection handshaking is described in detail in the USB 2.0 specification.

Figure 3:
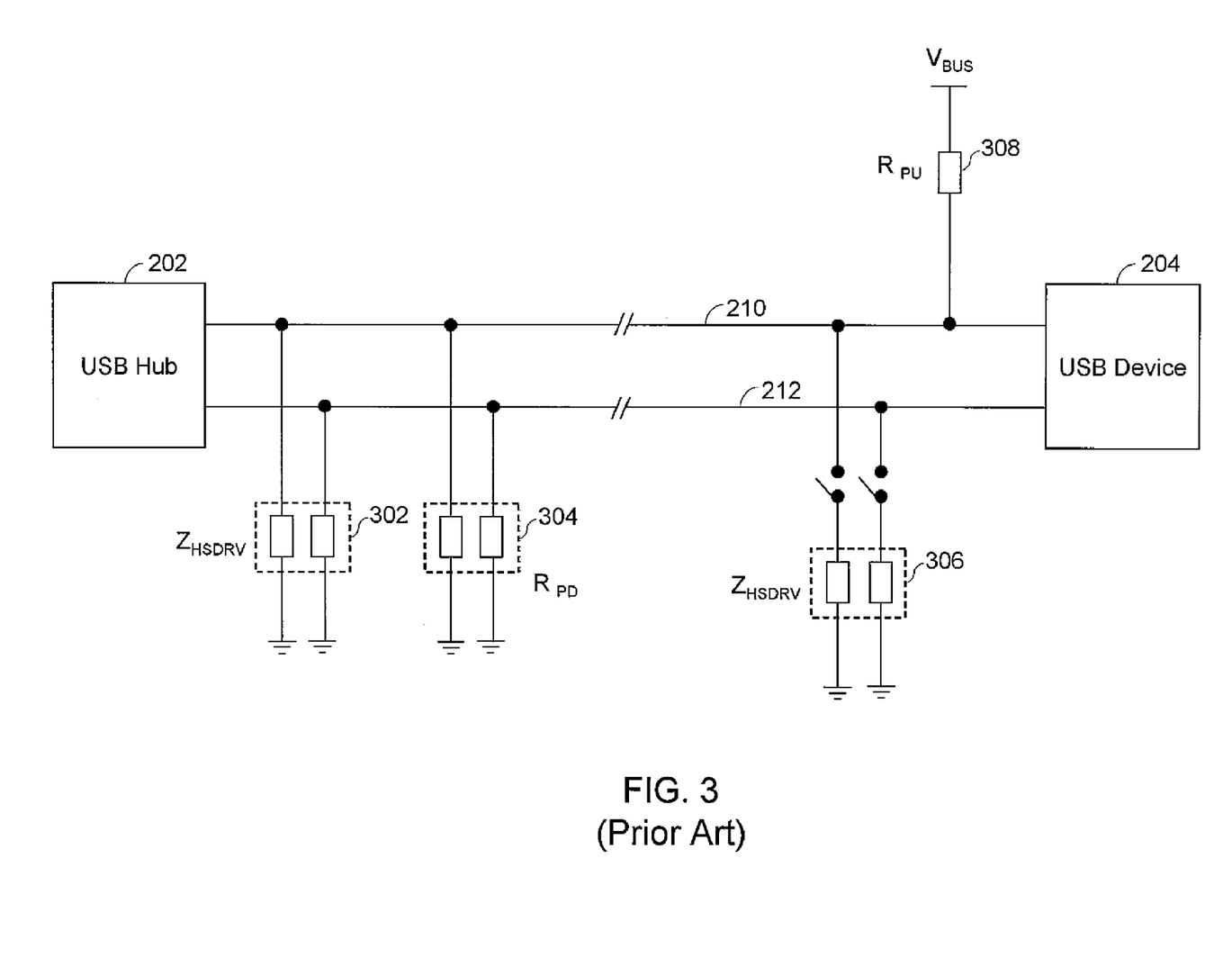
FIG. 3 is a schematic diagram illustrating the USB hub, the USB device, and the USB bus during high-speed detection handshake in the USB system of FIG. 1.

Referring now to FIG. 3, a schematic circuit diagram illustrating the USB hub 202, the USB device 204, and the USB bus 216 during high-speed detection handshaking in the USB system 100 is shown. The USB host 202 includes a high-speed termination resistor bank 302 and a pull-down resistor bank 304. Similarly, the USB device 204 includes a high-speed termination resistor bank 306 and a pull-up resistor 308. The bus voltage provided by the voltage wire 208 is $V_{BUS}$. It is to be noted that the resistor banks 302 and 304 are internal to the USB host 202 and the resistor bank 306 and resistor 308 are internal to the USB device 204; these elements are shown outside only for clarity of representation.

During the high-speed detection handshake, the high-speed termination resistor bank 302 and the pull-down resistor bank 304 are connected to the USB bus 216. The high-speed termination resistor bank 306 is disconnected and instead the pull-up resistor 308 is connected to the first data line 210. In this state, an offset voltage appears on the first data line 210 and accordingly, the voltage level at the first data line 210 is not precisely at ground level, which is expected in the ideal case.

In accordance with the USB 2.0, each resistor in the high-speed termination resistor banks 302 and 306 should be 45 Ohm (+/−5%), each resistor in the pull-down resistor bank 304 should be 15 KOhm (+/−5%) and the pull-up resistor 308 should be 1.5 KOhm (+/−5%). Further, the bus voltage should be 3.3 V (+/−0.3V). If the high-speed termination resistor bank 302 has resistors of 49.5 Ohm, the pull-up resistor 308 is 0.9 KOhm resistor, and the bus voltage is 3.6 V, the offset voltage may be as high as 186 mV, in which case the squelch detector will indicate that the differential signal on the USB bus 216 is a valid signal. Therefore, the differential signal may be detected as a 'J-state' of the USB system 100. Thus, the USB hub 202 will detect an incorrect state of the USB bus 216. Accordingly, the high-speed detection handshake is aborted and the USB hub 202 and the USB device 204 establish a communication link in the full-speed communication mode. Thus, the offset voltage appearing on the first data line (DP) 210 may lead to an unsuccessful high-speed detection handshake and hence, must be addressed.

Figure 4:
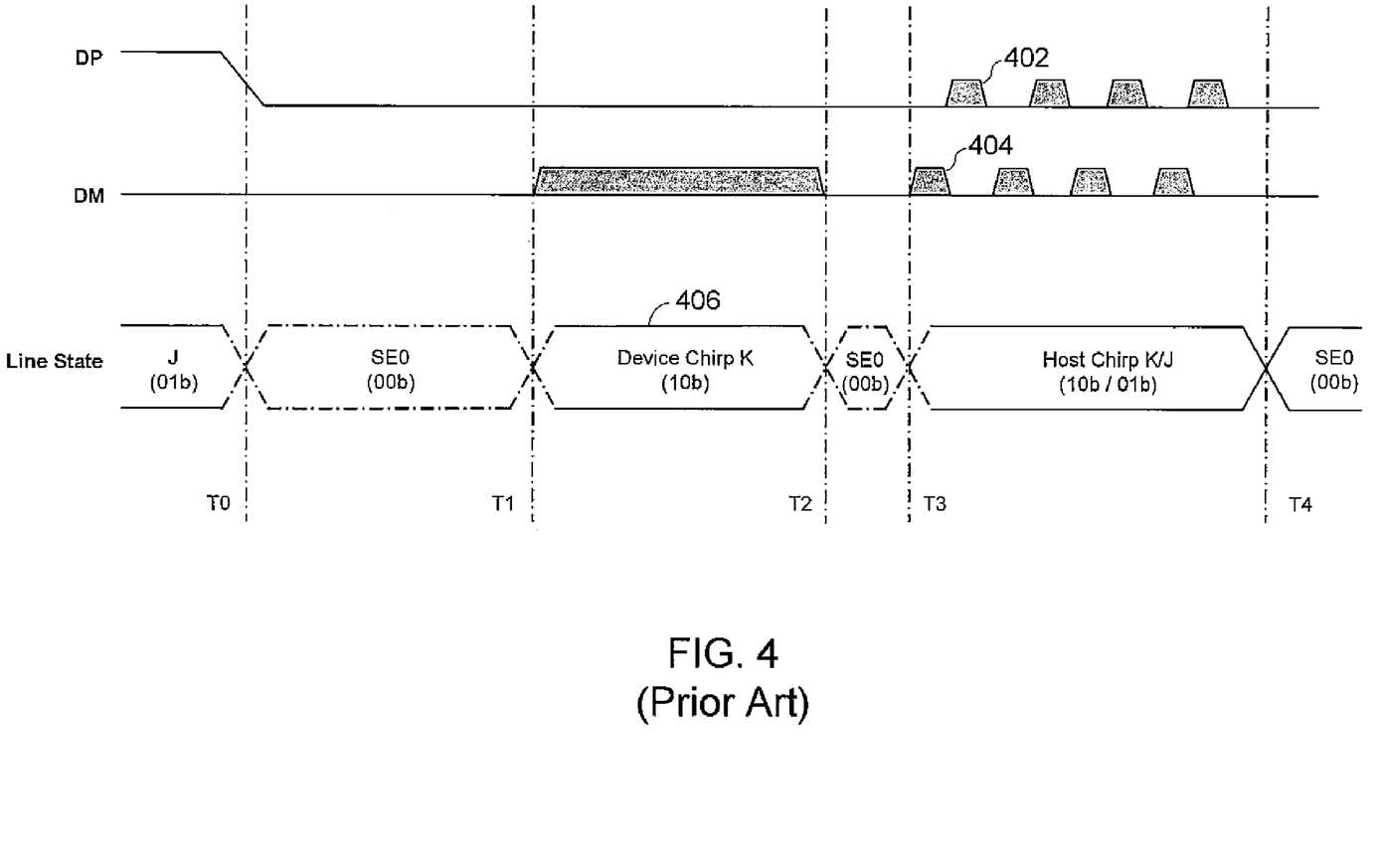
FIG. 4 illustrates a first signal profile of a first data line, a second signal profile of a second data line, and a line state profile during the high-speed detection handshake in the USB system of FIG. 1.

Referring now to FIG. 4, a first signal profile 402 of the first data line 210, a second signal profile 404 of the second data line 212, and a line state profile 406 during the high-speed detection handshake in the USB system 100 is shown.

The first signal profile 402 shows variation in voltage level of the first data line 210. Similarly, the second signal profile 404 shows variation in voltage level of the second data line 212. The line state profile 406 shows an ideal variation in a line state of the USB bus 216 during the high-speed detection handshake.

The line state of the USB bus 216 is based on the voltage levels in the first data line 210 and the second data line 212. The line state is used in the USB hub 202 and the USB device 204 to process the signals received on the USB bus 216. In accordance with USB 2.0, the following four line states are defined—SE0 (DM=0, DP=0); J-State (DM=0, DP=1); K-State (DM=1, DP=0); and SE1 (DM=1, DP=1), where DP and DM are logical values corresponding to the voltage levels of the first data line 210 and the second data line 212 respectively.

As shown in FIG. 4, the USB host 202 asserts a reset signaling on the USB bus 216 by pulling down the voltage levels of the first and second data lines 210 and 212 to ground level at time $T_0$. The corresponding line state should be detected as SE0. The USB device 204 transmits a device chirp from time $T_1$ to time $T_2$. The line state should change from SE0 to K-State. If the USB hub 202 detects the device chirp signal, it initiates a sequence of hub chirp signals from time $T_3$. The line state should alternate between the K-State and the J-State between times $T_3$ and $T_4$.

However, due to the offset voltage present on the first data line 210, the squelch detector may indicate a valid signal on the USB bus 216 and a J-State of the USB bus 216 may be detected between the times $T_0$ and $T_1$ and the times $T_2$ and $T_3$. This incorrect line state detection will cause the high-speed handshake detection to abort. Consequently, though the USB hub 202 and the USB device 204 are high-speed capable, they will eventually only establish a communication link in full-speed communication mode.

It would be advantageous to have a USB device that can accurately conduct a high-speed detection handshake so that data can be transmitted between USB devices at a maximum available rate.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for performing a high-speed detection handshake between a first transceiver and a second transceiver interconnected through a USB bus is provided. The USB bus includes a first data line (DP) and a second data line (DM). The method of high-speed detection handshaking includes asserting a reset signaling at the USB bus in which the first and the second data lines are driven to a first voltage level for a predefined time interval at the first transceiver. The first and the second transceivers include a corresponding dual-mode squelch detector. The dual-mode squelch detectors in the first the second transceivers are activated in a first mode of operation. In the first mode of operation, the dual-mode squelch detector generates a squelch signal based on a differential signal received from the USB bus such that the squelch signal is in a first predefined state when the differential signal is below a first threshold voltage level and the squelch signal is in a second predefined state when the differential signal exceeds a second threshold voltage level.

The method further includes initiating a chirp signaling between the first and the second transceivers. Based on successful completion of the chirp signaling, a high-speed communication mode is enabled in the first and the second transceivers. Subsequently, the dual-mode squelch detectors in the first and the second transceivers are activated in a second mode of operation. In the second mode of operation, the dual-mode squelch detectors generate a squelch signal based on a differential signal received from the USB bus such that the squelch signal is in the first predefined state when the differential signal is below a third threshold voltage level and the squelch signal is in the second predefined state when the differential signal exceeds a fourth threshold voltage level.

In another embodiment of the present invention, a USB system is provided. The system includes a first transceiver and a second transceiver. The first and second transceivers are interconnected via a USB bus. The USB bus includes a first data line and a second data line.

The first transceiver includes a full-speed driver, a first dual-mode squelch detector, a differential receiver, and a high-speed current driver. The full-speed driver asserts a reset signaling by driving the first and the second data lines to ground level for a predefined time interval. The first dual-mode squelch detector generates a squelch signal and is operable in two modes. The differential receiver detects a device chirp signal. The high-speed current driver generates a sequence of hub chirp signals.

The second transceiver includes a high-speed current driver, a differential receiver, and a second dual-mode squelch detector. The high-speed current driver generates the device chirp signal. The differential receiver detects the reset signaling and the sequence of hub chirp signals. The second dual-mode squelch detector generates a squelch signal and is operable in two modes.

The dual-mode squelch detector generates the squelch signal based on a differential signal received from the USB bus. In a first mode of operation of the dual-mode squelch detector, the squelch signal is in a first predefined state when the differential signal is below a first threshold voltage level, and the squelch signal is in a second predefined state when the differential signal exceeds a second threshold voltage level. In a second mode of operation of the dual-mode squelch detector, the squelch signal is in the first predefined state when the differential signal is below a third threshold voltage level, and wherein the squelch signal is in the second predefined state when the differential signal exceeds a fourth threshold voltage level.

Various embodiments of the present invention provide an improved system and method for high-speed detection handshake in the USB system. The present invention ensures that the line states are correctly detected during the high-speed detection handshake and thus, significantly reduces the failure rate of high-speed capable USB devices in negotiating a communication link in the high-speed communication mode.

The present invention will be described hereinafter in the context of a USB hub and a USB device capable of communicating in high-speed communication mode. Various embodiments of the present invention are equally applicable to the cases in which either the USB hub or the USB device are not high-speed capable.

Figure 5A:
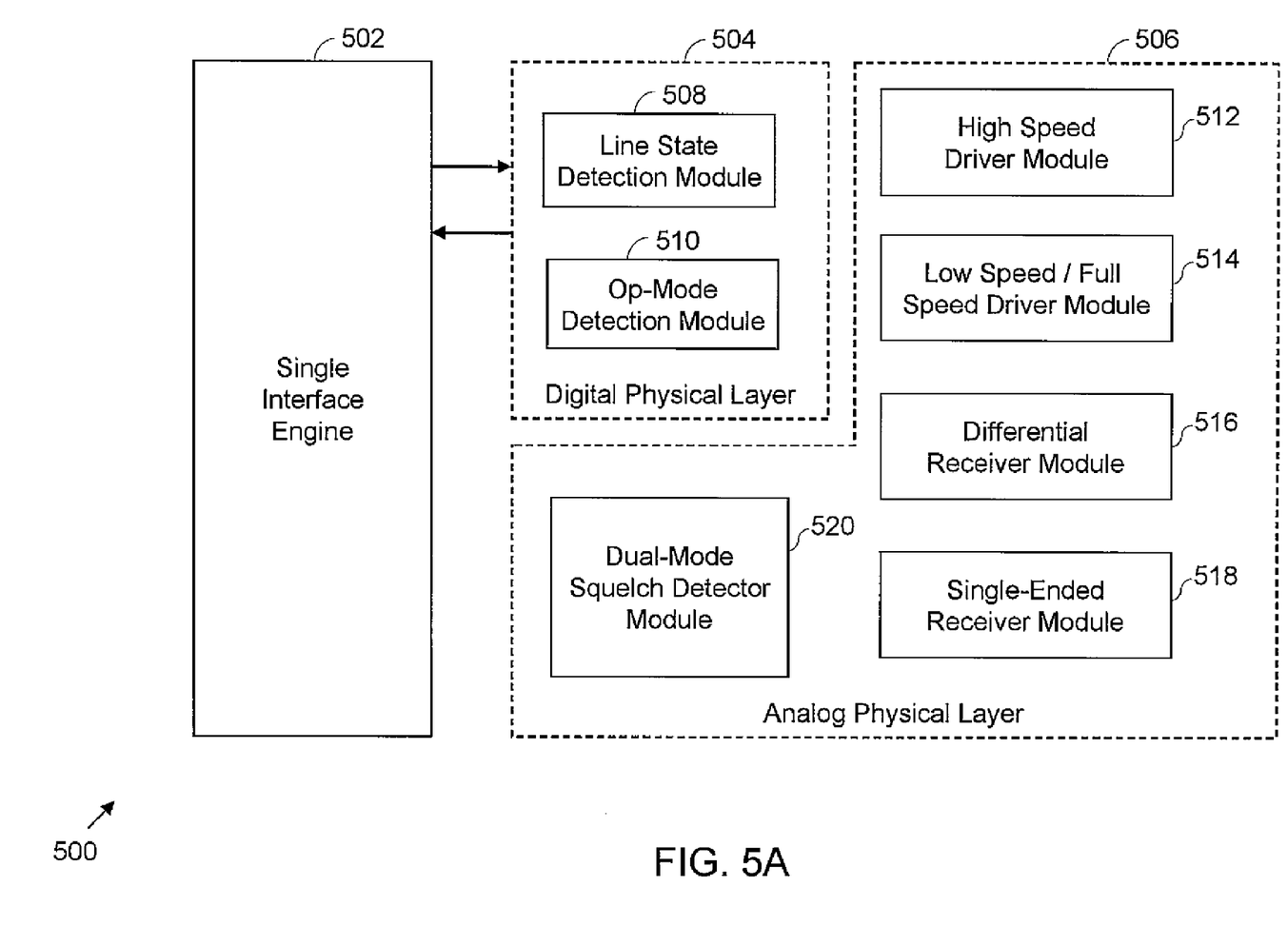
FIGS. 5A and 5B are block diagrams illustrating a transceiver in a USB system in accordance with an embodiment of the present invention.
Figure 5B:
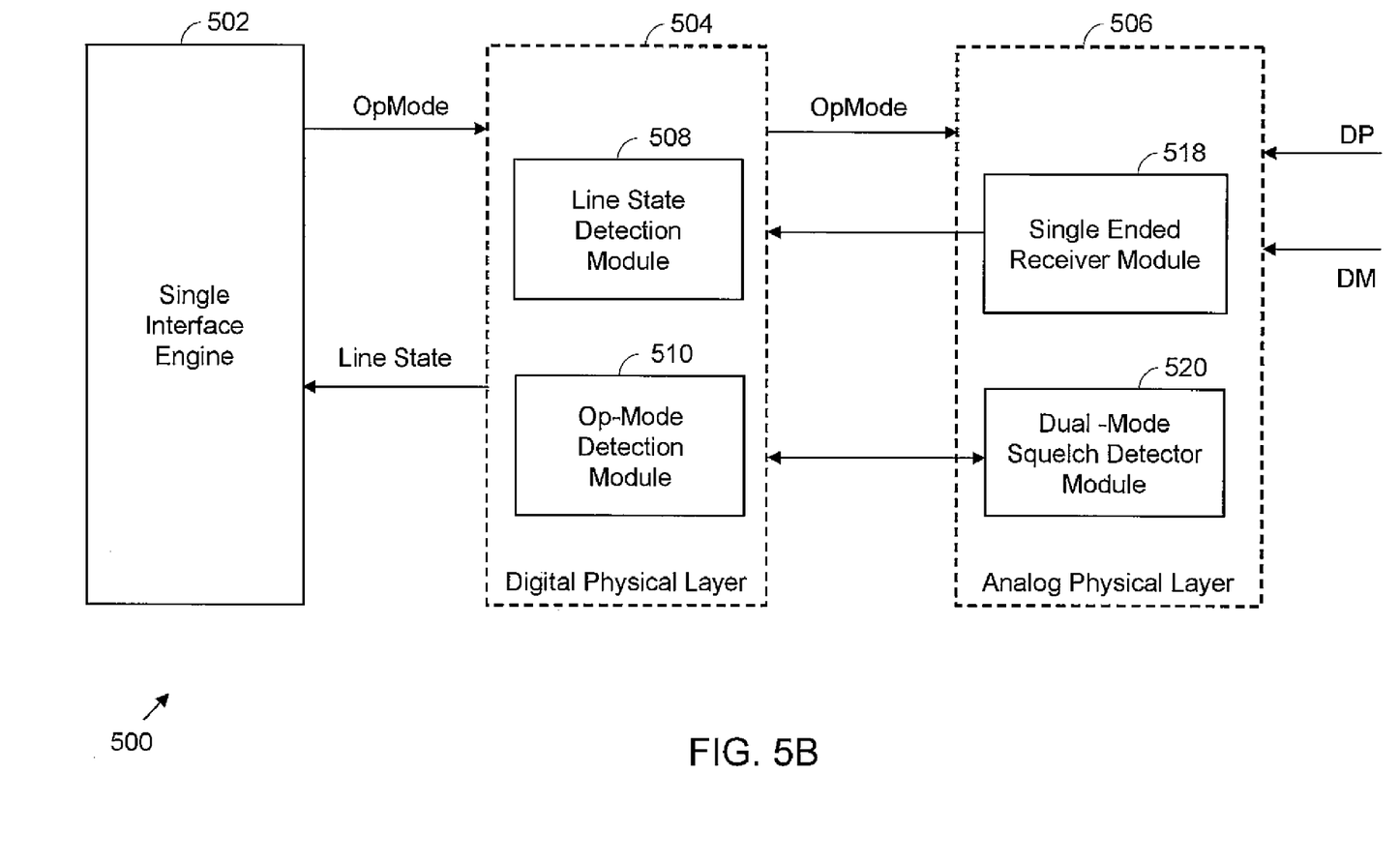

Referring now to FIGS. 5A and 5B, block diagrams illustrating a transceiver 500 in accordance with an embodiment of the present invention is shown. The first transceiver in the USB hub 202 and the second transceiver in the USB device 204 are implemented in accordance with the description of the transceiver 500.

The transceiver 500 includes a single interface engine 502, a digital physical layer 504, and an analog physical layer 506. The digital physical layer 504 includes a line state detection module 508 and an op-mode detection module 510. The analog physical layer 506 includes a high-speed driver module 512, a low-speed/full-speed driver module 514, a differential receiver module 516, a single-ended receiver module 518, and a dual-mode squelch detector module 520.

The single interface engine 502 includes a state machine and sequencing logic for handling USB packet transactions. The single interface engine 502 also generates control signals for managing the functionality of digital physical layer 504 and the analog physical layer 506.

The line state detection module 508 receives the output from the single ended receiver module 518 and determines the line state of the USB bus 216. The line state is provided to the single interface engine 502, which processes the signals received from the USB bus 216 in accordance with the line state of the USB bus 216. The op-mode detection module 510 receives control signals from the single interface engine 502 corresponding to an operational mode of the USB hub 202 or the USB device 204. In accordance with USB 2.0, the USB hub 202 and the USB device 204 operate in the following four operational modes—normal operation, non-driving, disable bit stuffing and NRZI encoding, and reserved.

The high-speed driver module 512 drives a predefined amount of current to transmit signals in a high-speed communication mode. The low-speed/full-speed driver module 514 drives the first data line 210 and the second data line 212 to predefined voltages to transmit signals in a low-speed and a full-speed communication mode. For example, the low-speed/full-speed driver module 514 asserts a reset signaling on the USB bus 216 driving the first data line 210 and the second data line 212 to ground voltage level to initiate a high-speed detection handshake between the USB hub 202 and the USB device 204. Further, the low-speed/full-speed driver module 514 provides the high-speed terminations, for example, high-speed termination resistor banks 302 and 306.

The differential receiver module 516 detects a differential signal on the USB bus 216 in low-speed/full-speed and high-speed communication mode. In accordance with various embodiments of the present invention, separate differential receiver modules may be implemented, such that one is for low-speed/full-speed communication mode and another is for high-speed communication mode. The single ended receiver module 518 detects the voltage level on the first data line 210 and the second data line 212.

The dual-mode squelch detector module 520 provides a squelch signal indicating the validity of the differential signal (detected by the differential receiver module 516) and the voltage levels on the USB bus 216 (detected by the single ended receiver module 518). The dual-mode squelch detector module 520 generates a squelch signal with logic 0 to indicate a valid signal and a squelch signal with logic 1 to indicate an invalid signal.

In accordance with various embodiments of the present invention, dual-mode squelch detector module 520 is operable in two distinct modes of operation. In the first mode of operation, if the differential signal is below a first threshold voltage level $V_{L-1}$, the differential signal is considered invalid. The differential signal between the first data line 210 and the second data line 212 should exceed a second voltage threshold level $V_{H-1}$ to be qualified as a valid signal. In the second mode of operation, if the differential signal is below a third threshold voltage level $V_{L-2}$, the differential signal is considered invalid. The differential signal between the first data line 210 and the second data line 212 should exceed a fourth threshold voltage level $V_{H-2}$ to be qualified as a valid signal.

In an embodiment of the present invention, the first threshold voltage level is selected from a range varying from about 190 mV to about 210 mV; and the second threshold voltage level is selected from a range varying from about 230 mV to about 250 mV. Further, the third threshold voltage level is set at 100 mV and the fourth threshold voltage level is set at 150 mV.

In accordance with USB 2.0, the following four distinct operational modes are defined for the transceiver 500—normal mode, non-driving mode, disable bit stuffing and NRZI encoding, and reserved.

When the transceiver 500 participates in a high-speed detection handshake, the operational mode of the transceiver 500 is configured to the 'disable bit stuffing and NRZI encoding' mode. In accordance with various embodiments of the present invention, this operational mode is referred to as handshake mode. When the transceiver 500 is receiving or transmitting any other signal, the operational mode of the operational mode of the transceiver 500 may be configured to one of the normal mode, the non-driving mode, and the reserved mode. In accordance with various embodiments of the present invention, these operational modes are collectively referred to as non-handshake mode. The dual-mode squelch detector module 520 operates in the first mode of operation when the operational mode of the transceiver 500 is configured to handshake mode; and in the second mode of operation when the operational mode of the transceiver 500 is configured to non-handshake mode.

When the USB host 102 sends a reset request to the USB hub 202 for initiating a high-speed detection handshake, the single interface engine 502 transmits control signals to the digital physical layer 504 and the analog physical layer 506 to assert a reset signaling on the USB bus 216. The single interface engine 502 also sends control signals to the digital physical layer 504 to switch the operational mode from the current operational mode to the handshake mode. At this stage, the op-mode detecting module 510 provides control signals to the dual-mode squelch detector module 520 to initiate the first mode of operation. Subsequently, when the reset procedure is complete, the single interface engine changes the operational mode from the handshake mode to a suitable non-handshake mode. At this stage, the op-mode detecting module 510 provides control signals to the dual-mode squelch detector module 520 to initiate the second mode of operation.

Figure 6:
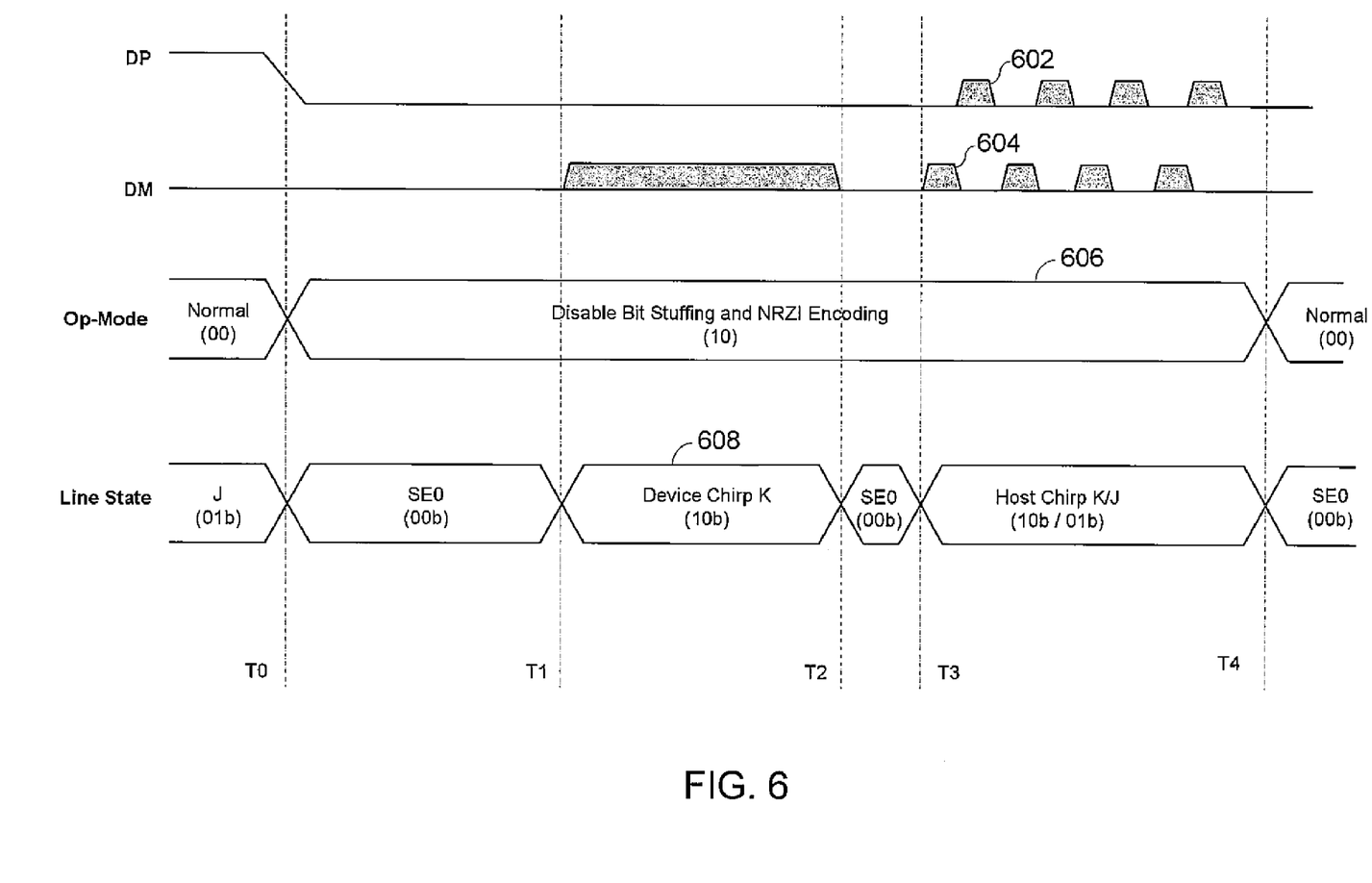
FIG. 6 illustrates a first signal profile of the first data line, a second signal profile of the second data line, an op-mode profile, and a line state profile during the high-speed detection handshake in a USB system in accordance with an embodiment of the present invention.

Referring now to FIG. 6, a first signal profile 602 of the first data line 210, a second signal profile 604 of the second data line 212, an op-mode profile 506, and a line state profile 608 during the high-speed detection handshake in the USB system 100 in accordance with an embodiment of the present invention is shown.

The first signal profile 602 shows variation in the voltage level of the first data line 210. The second signal profile 604 shows variation in the voltage level of the second data line 212. The op-mode profile 606 shows the variation in operational mode of the USB hub 202 and the USB device 204. The line state profile 608 shows the variation in the line state of the USB bus 216 as detected by the USB hub 202 and the USB device 204, during the high-speed detection handshake.

As described earlier, the line state of the USB bus 216 is based on the voltage levels in the first data line 210 and the second data line 212. The line state is used in the USB hub 202 and the USB device 204 to process the signals received through the USB bus 216.

The USB hub 202 asserts a reset signaling on the USB bus 216 by pulling down the voltage levels of the first data and second data lines 210 and 212 to ground level at time instant $T_0$.

As described in conjunction with FIGS. 5A and 5B, the operational mode is changed from the current operational mode to the handshake mode. At this stage, the op-mode detecting module 510 provides control signals to the dual-mode squelch detector module 520 to activate the first mode of operation.

The corresponding line state is detected to be in SE0 between $T_0$ and $T_1$. The USB device 204 transmits a device chirp from time instant $T_1$ to time instant $T_2$. The line state changes from SE0 to K-State from time instant $T_1$ to time instant $T_2$ and reverts to SE0 from K-State at time instant $T_2$. The line state remains in SE0 from time instant $T_2$ to time instant $T_3$. When the USB hub 202 detects the device chirp signal, the USB hub 202 initiates a sequence of hub chirp signals from time instant $T_3$. The line state alternates between K-State and J-State between time instants $T_3$ and $T_4$.

At time instant $T_4$, when the reset procedure is complete, the single interface engine 502 changes the operational mode from the handshake mode to a suitable non-handshake mode. At this stage, the op-mode detecting module 510 provides control signals to the dual-mode squelch detector module 520 to activate the second mode of operation.

Figure 7:
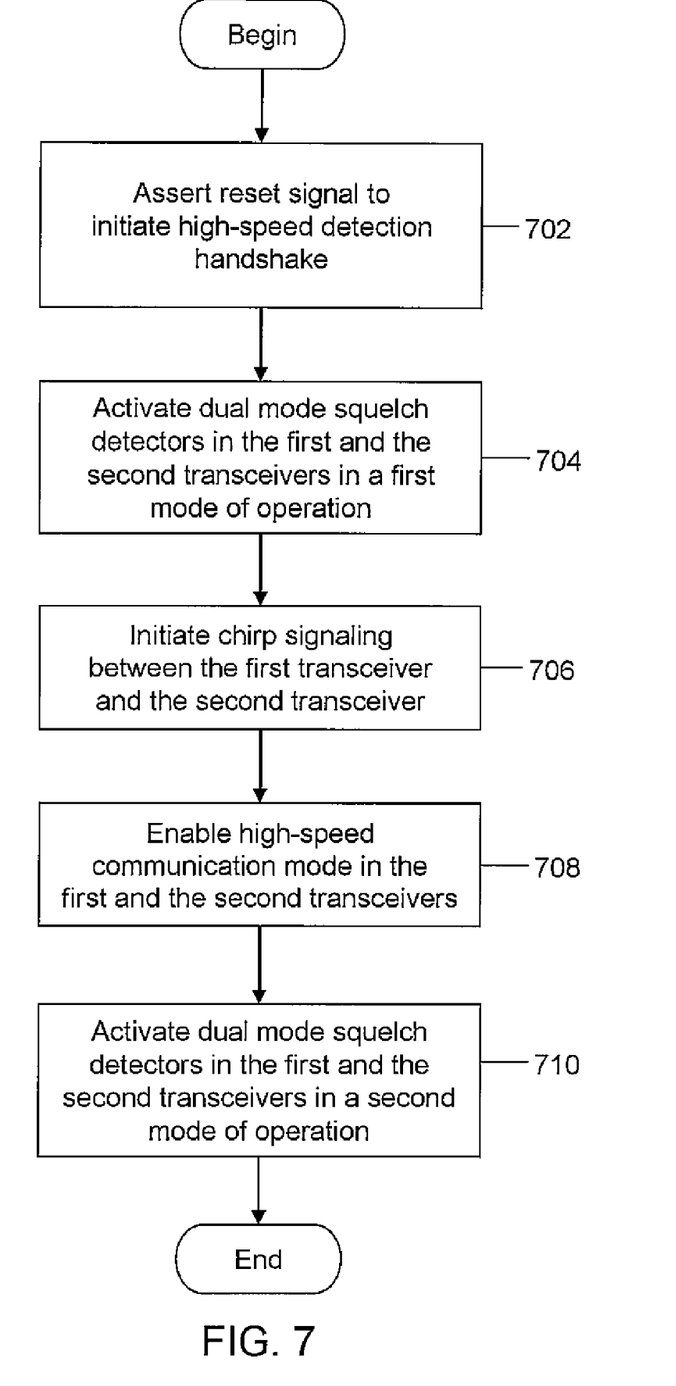
FIG. 7 is a flowchart illustrating a method for high-speed detection handshaking between a first transceiver and a second transceiver in a USB system in accordance with an embodiment of the present invention.

Referring now to FIG. 7, a flowchart illustrating a method for performing a high-speed detection handshake between a first transceiver and a second transceiver in a USB system, in accordance with an embodiment of the present invention is shown.

At step 702, a reset signaling is asserted at a USB bus to initiate a high-speed detection handshake. A first data line and a second data line are driven to ground level. Further, the operational modes of the first and the second transceivers are configured in to handshake mode based on assertion of the reset signaling.

At step 704, the dual-mode squelch detectors in the first and the second transceivers are activated in a first mode of operation based on the operational modes of the first and the second transceivers being in the handshake mode.

At step 706, a chirp signaling between the first and the second transceivers is initiated. The second transceiver transmits a device chirp signal to the first transceiver. In response, the first transceiver transmits a sequence of hub chirp signals to the second transceiver.

At step 708, a communication link between the first and the second transceivers is configured in high-speed communication mode. Further, the reset signaling is terminated and the operational modes of the first and the second transceivers are configured in a non-handshake mode based on termination of the reset signaling.

At step 710, the dual-mode squelch detectors in the first and the second transceivers are activated in a second mode of operation based on the operational mode of the first and the second transceivers being in the non-handshake mode.

Figure 8A:
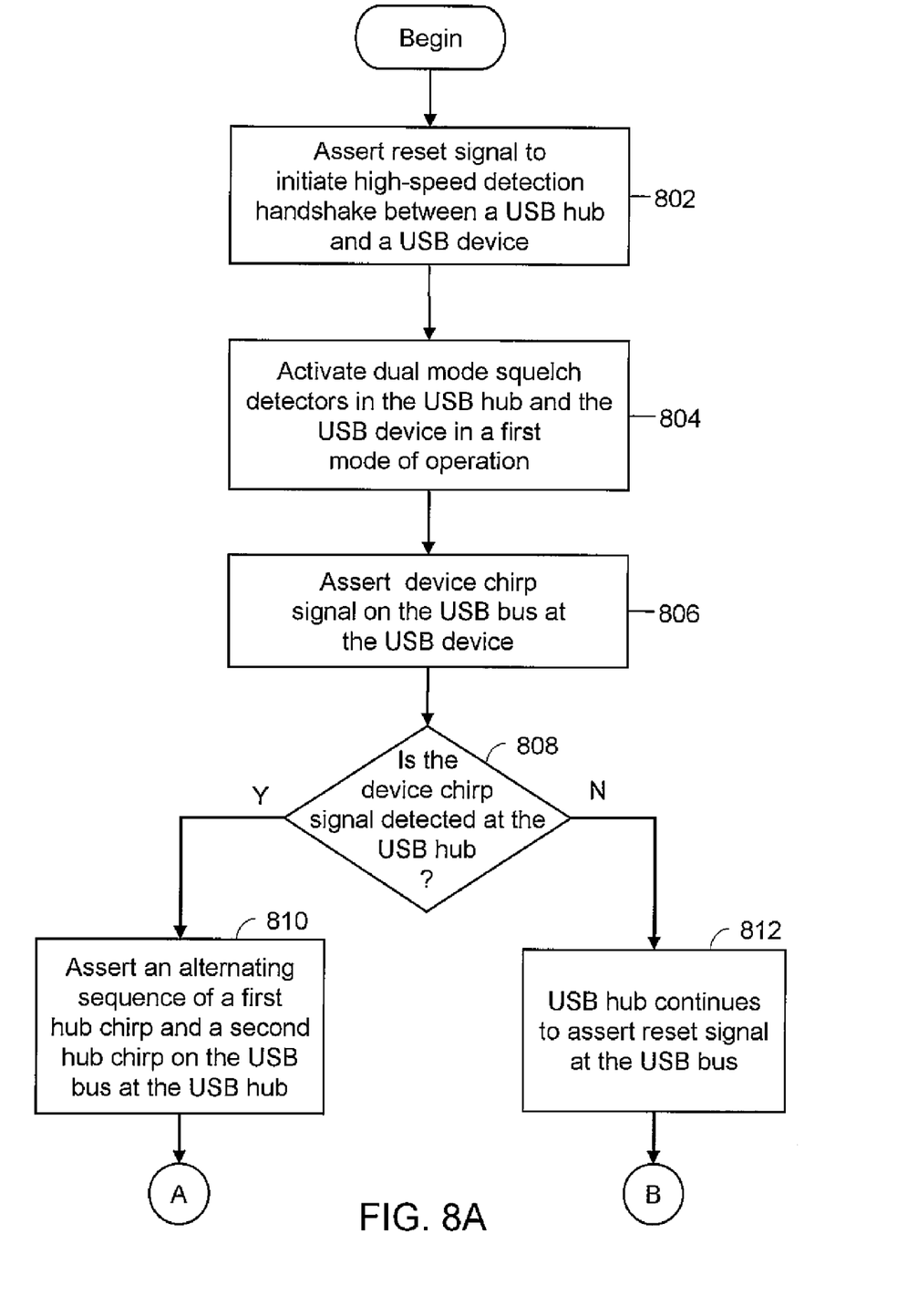
FIGS. 8A and 8B are a flowchart illustrating a method for high-speed detection handshaking between a USB hub and a USB device in a USB system in accordance with another embodiment of the present invention.
Figure 8B:
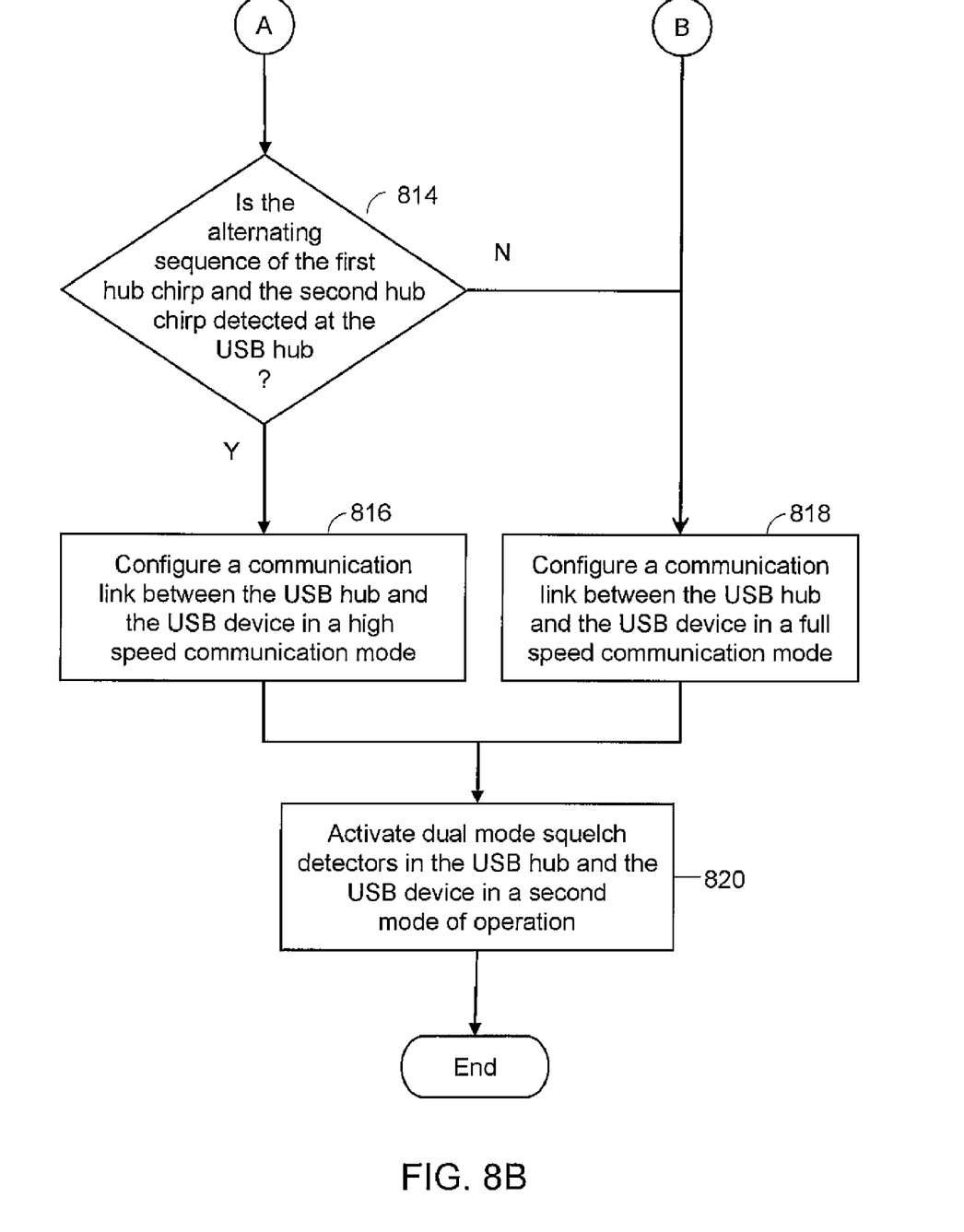

Referring now to FIG. 8, a flowchart illustrating a method for high-speed detection handshake between a USB hub and a USB device in a USB system in accordance with another embodiment of the present invention is shown.

At step 802, a reset signaling is asserted at a USB bus to initiate a high-speed detection handshake between the USB hub and the USB device. While asserting the reset signaling, a first data line and a second data line connecting the USB hub and the USB device are driven to a ground voltage level. Further, the operational modes of the USB hub and the USB device are configured in a first predefined state, namely, a handshake mode based on assertion of the reset signaling. In an embodiment of the present invention, the operational modes of the USB hub and the USB device are configured to 'disable bit stuffing and NRZI encoding' mode in accordance with USB 2.0.

At step 804, the dual-mode squelch detectors in the USB hub and the USB device are activated in a first mode of operation based on the operational modes of the USB hub and the USB device being in the first predefined state.

At step 806, the USB device transmits a device chirp signal to the USB hub to initiate a chirp signaling between the USB hub and the USB device.

At step 808, it is determined if the device chirp signal is detected at the USB hub. If the device chirp signal is successfully detected at the USB hub, then the USB hub transmits an alternating sequence of a first hub chirp signal and a second hub chirp signal to the USB device at step 810. However, if the device chirp is not successfully detected at the USB hub, the USB hub continues to assert the reset signaling on the USB bus for a predefined time interval at step 812 and subsequently, the communication link between the USB hub and the USB device is configured in full-speed communication mode at step 818.

At step 814, it is determined whether or not the alternating sequence of the first and the second hub chirp signals has been detected at the USB device. If the hub chirp signals were detected successfully at the USB device, a communication link between the USB hub and the USB device is configured in high-speed communication mode at step 816. However, if the hub chirp signals were not detected successfully at the USB device, the communication link between the USB hub and the USB device is configured in full-speed communication mode at step 818.

Further, at both steps 816 and 818, the reset signaling is terminated and the operational modes of the USB hub and USB device are configured in a second predefined state, namely, a suitable non-handshake mode on termination of the reset signaling. In an embodiment of the present invention, the operational mode of the first transceiver is configured to 'normal mode' in accordance with USB 2.0.

At step 820, the dual-mode squelch detectors in the USB hub and the USB device are activated in a second mode of operation based on the operational mode of the USB hub and the USB device being in the second predefined state.

Various embodiments of the present invention provide an improved system and method of high-speed detection handshake in universal serial bus based data communication system. The present invention ensures that the line states are correctly detected during the high-speed detection handshake and thus, significantly reduces the failure rate of high-speed capable USB devices in negotiating a communication link in the high-speed communication mode.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for high-speed detection handshake between a first transceiver and a second transceiver connected with a USB bus, the USB bus comprising a first data line (DP) and a second data line (DM), the method comprising:

asserting a reset signaling at the USB bus that drives the first and second data lines to a first voltage level for a predefined time interval at the first transceiver;

activating a dual-mode squelch detector in each of the first transceiver and the second transceiver in a first mode of operation, wherein the dual-mode squelch detectors in the first mode of operation generate a squelch signal based on a differential signal received from the USB bus, wherein the squelch signal is in a first predefined state when the differential signal is below a first threshold voltage level and in a second predefined state when the differential signal exceeds a second threshold voltage level;

initiating a chirp signaling between the first transceiver and the second transceiver;

enabling a high-speed communication mode in the first and the second transceivers based on successful completion of the chirp signaling; and activating the dual-mode squelch detectors in each of the first and second transceivers in a second mode of operation, wherein the dual-mode squelch detectors in the second mode of operation generate a squelch signal based on the differential signal received from the USB bus, wherein the squelch signal is in the first predefined state when the differential signal is below a third threshold voltage level, and in the second predefined state when the differential signal exceeds a fourth threshold voltage level.

2. The method for high-speed detection handshake of claim 1, wherein when the reset signaling is asserted, an operational mode of the first transceiver switches from a current state to a first predefined state.

3. The method for high-speed detection handshake of claim 1, further comprising detecting the reset signaling at the second transceiver.

4. The method for high-speed detection handshake of claim 3, wherein when the reset signaling is detected, an operational mode of the second transceiver switches from a current state to a first predefined state.

5. The method for high-speed detection handshake of claim 1, wherein the dual-mode squelch detectors in each of the first and second transceivers are activated in the first mode of operation when an operational mode of the first and the second transceivers is in a first predefined state.

6. The method for high-speed detection handshake of claim 1, wherein the first and second threshold voltage levels in the first mode of operation are based on an offset voltage present on the first and second data lines during the high-speed detection handshake.

7. The method for high-speed detection handshake of claim 1, wherein the chirp signaling comprises:
asserting a device chirp signal on the USB bus; and
asserting an alternating sequence of a first hub chirp and a second hub chirp on the USB bus.

8. The method for high-speed detection handshake of claim 1, wherein the dual-mode squelch detectors in each of the first and second transceivers are activated in the second mode of operation when an operational mode of the first and the second transceivers is in a second predefined state.

9. The method for high-speed detection handshake of claim 1, wherein the first threshold voltage level in the first mode of operation is selected from a range of voltages varying from about 190 mV to about 210 mV, and the second threshold voltage level in the first mode of operation is selected from a range of voltages varying from about 220 mV to about 250 mV.

10. The method for high-speed detection handshake of claim 1, wherein the third threshold voltage level in the second mode of operation is 100 mV, and the fourth threshold voltage level in the second mode of operation is 150 mV.

11. The method for high-speed detection handshake of claim 1, wherein a full-speed communication mode is enabled on the first and second transceivers based on unsuccessful completion of chirp signaling.

12. A USB system, comprising:
a first transceiver including,
a full-speed driver for asserting a reset signaling that drives first and second data lines to a first predefined voltage level for a predefined time interval;
a first dual-mode squelch detector for generating a first squelch signal, wherein the first dual-mode squelch detector is operable in two modes;
a first differential receiver for detecting a device chirp signal; and
a first high-speed current driver for generating a sequence of hub chirp signals;
a second transceiver including,
a second high-speed current driver for generating the device chirp signal;
a second differential receiver for detecting the reset signaling and the sequence of hub chirp signals; and
a second dual-mode squelch detector for generating a second squelch signal, wherein the second dual-mode squelch detector is operable in two modes; and
a USB bus connecting the first transceiver and the second transceiver, wherein the USB bus comprises the first and second data lines, wherein,
each of the first and the second dual-mode squelch detectors generates a squelch signal based on a differential signal received from the USB bus,
each of the first and the second dual-mode squelch detectors is operable in a first mode of operation,
the squelch signal is in a first predefined state when the differential signal is below a first threshold voltage level,
the squelch signal is in a second predefined state when the differential signal exceeds a second threshold voltage level,
each of the first and the second dual-mode squelch detectors is operable in a second mode of operation,
the squelch signal is in the first predefined state when the differential signal is below a third threshold voltage level, and
the squelch signal is in the second predefined state when the differential signal exceeds a fourth threshold voltage level.

13. The USB system of claim 12, wherein each of the first data line and the second data line are connected to a high-speed driver termination network at the first transceiver and to a full-speed driver termination network at the second transceiver, and wherein the first data line is connected to a pull-up resistor of the full-speed driver termination network at the second transceiver.

14. The USB system of claim 12, wherein the dual-mode squelch detector is activated in the first mode of operation when an operational mode of the first and the second transceivers is in a first predefined state.

15. The USB system of claim 12, wherein the dual-mode squelch detector is activated in the second mode of operation when an operational mode of the first transceiver is in a second predefined state.

16. The USB system of claim 12, wherein the first and second threshold voltage levels in the first mode of operation are based on an offset voltage present on the first and second data lines during the high-speed detection handshake.

17. The USB system of claim 12, wherein the first threshold voltage level in the first mode of operation is selected from a range of voltages varying from about 190 mV to about 210 mV, and wherein the second threshold voltage level in the first mode of operation is selected from a range of voltages varying from about 230 mV to about 250 mV.

18. The USB system of claim 12, wherein the third threshold voltage level in the second mode of operation is 100 mV and the fourth threshold voltage level in the second mode of operation is 150 mV.

* * * * *